Dec. 27, 1966  R. B. PHERSON  3,295,021
ELECTRICAL APPARATUS
Filed May 17, 1963  2 Sheets-Sheet 1
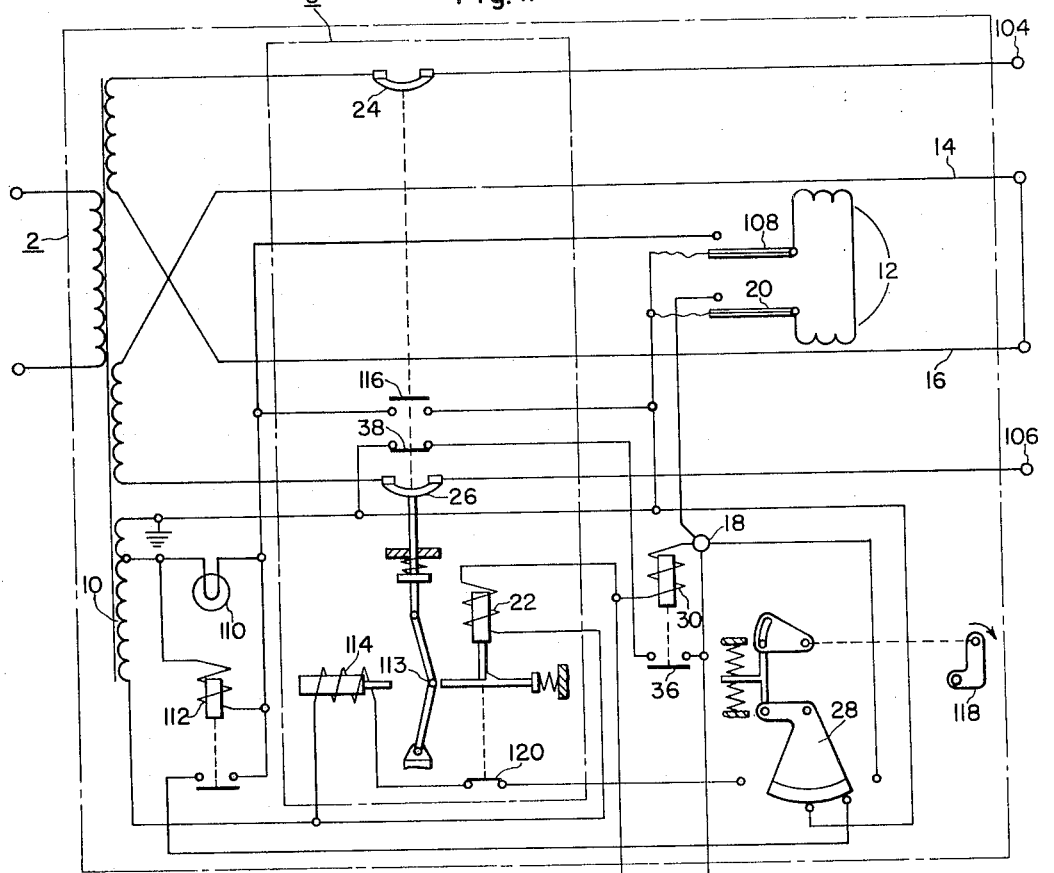
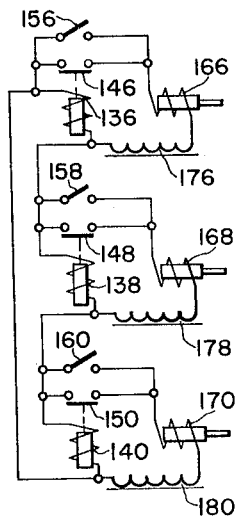
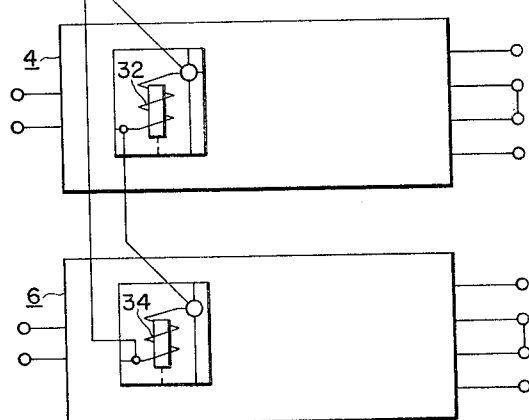
INVENTOR
Richard B. Pherson
BY
F. E. Browder
ATTORNEY United States Patent Office 3,295,021
Patented Dec. 27, 1966

3,295,021
ELECTRICAL APPARATUS
Richard B. Pherson, Geneva, Switzerland, assignor to Westinghouse Electric Corporation, East Pittsburgh, Pa., a corporation of Pennsylvania
Filed May 17, 1963, Ser. No. 281,220
2 Claims. (Cl. 317—46)

This invention relates in general to transformers having circuit breakers, and more particularly to an electrical interlock for transformer circuit breakers to prevent single-phasing when three single phase transformers are connected as a three phase transformer bank or one three phase transformer is used alone.

It is well known that electrical devices such as three phase motors may be damaged by operation on a single phase. This possibility of single-phasing has limited the use of three single phase transformers, which each incorporate circuit breaker protection, in three phase transformer banks. It is possible in this arrangement of transformers that only one transformer breaker might open in the event of a single phase fault or overload.

In manual operation of several single phase transformer circuit breakers serving a multi-phase load it is desirable that all circuit breakers open and close together, otherwise three human operators would be required to put the transformer bank on the line or to remove it from the line.

Accordingly, it is a general object of this invention to provide a new and improved electrical interlock for transformer circuit breakers when a plurality of transformers are operated together.

It is a more particular object of this invention to provide a new and improved electrical interlock for a plurality of circuit breakers used with a plurality of transformers to open all of the circuit breakers should one of the circuit breakers open.

Briefly, the present invention accomplishes the above cited objects by providing an electrical interlock for single phase transformer circuit breakers that will open all the phases of a bank of such transformers should a fault develop in any one phase. More specifically, to each single phase circuit breaker is added a relay which when connected in series with the relays of other similarly equipped single phase circuit breakers will open all circuit breakers if one circuit breaker is tripped.

Simultaneous manual reclosing of all the transformer circuit breakers may be achieved from one transformer breaker operating handle by interconnecting relays across the manual "close" contacts of the transformer circuit breaker operating handles. Simultaneous manual opening of all the transformer circuit breakers is accomplished in exactly the same manner as automatic opening except that the signal to open is given manually from any one of the transformer breaker operating handles.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawings, in which:

FIGURE 1 is a wiring diagram of an embodiment of the invention applied to three single phase transformers;

FIG. 3 is a simplified schematic diagram of the embodiment of the invention illustrated in FIG. 1.

Figure 2:
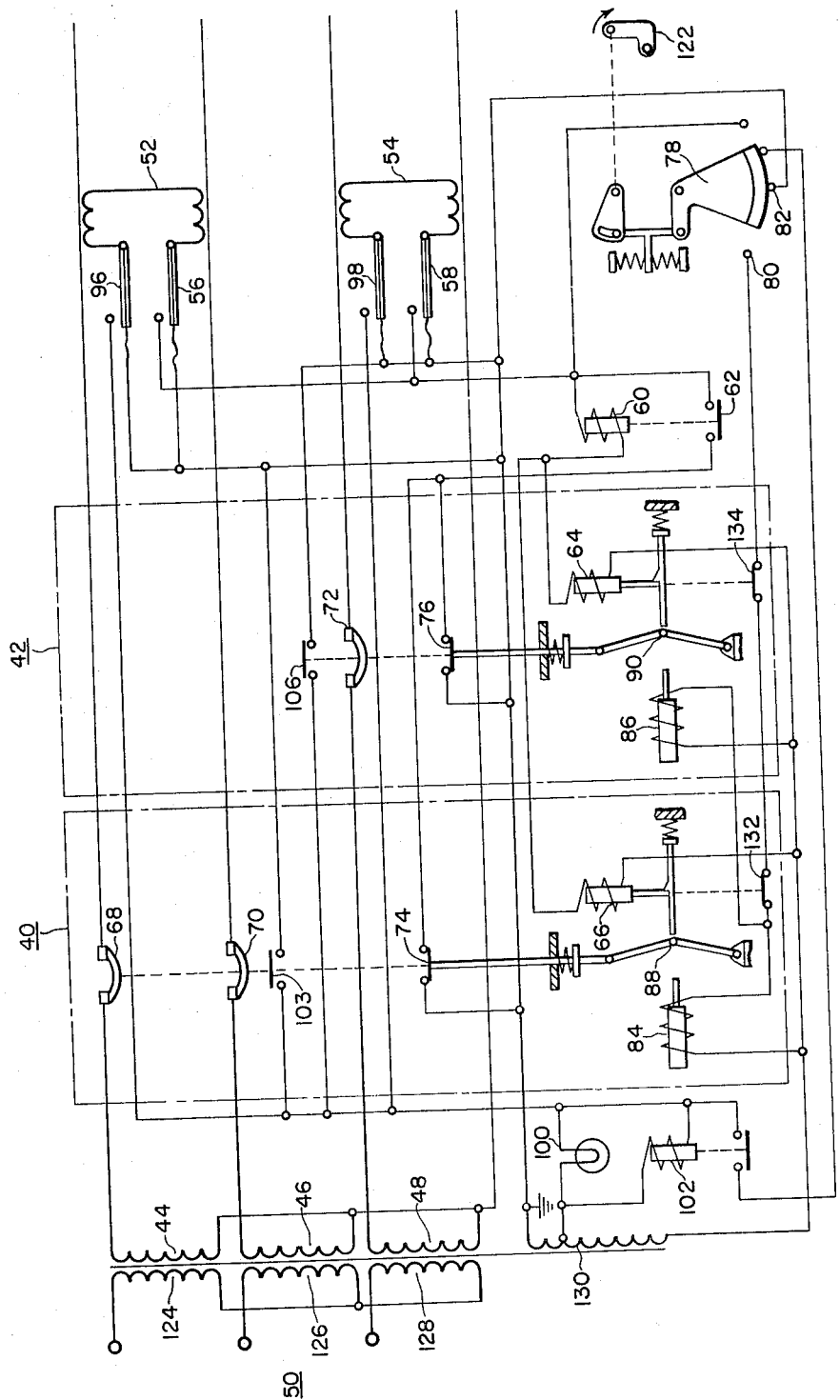
FIG. 2 is a wiring diagram of an embodiment of the invention applied to a three phase transformer.

The embodiment of the invention shown in FIG. 1 employs three, circuit breaker equipped, single phase transformers 2, 4 and 6. The transformers are so placed that three phase load connections can easily be made from terminals such as terminals 104 and 106 of transformer 2. In transformer 2 a pickup coil or instrument transformer 12 is provided to sense overloads on the transformer secondary leads 14 and 16. Bimetal elements 20 and 108 are in series with pickup coil 12. Bimetal 20 is a trip bimetal used to initiate circuit breaker operation; bimetal 108 is a signal bimetal used to indicate impending circuit breaker operation by energizing a light 110. Signal bimetal 108 is constructed to close before trip bimetal 20. A trip control relay 30 is supplied in circuit relationship with trip bimetal element 20. This relay energizes a trip solenoid 22 to operate a circuit breaker 8 which protects transformer 2. Normally open contact 36 is mechanically linked to trip control relay 30. A selector switch 28 and associated exterior operating handle 118 are provided for manual operation of the circuit breaker 8 which will be described in detail later.

A control winding 10 is provided on the secondary side of transformer 2. Signal light 110 is supplied from a portion of this winding. A latch relay 112 is provided in shunt with signal light 110 to keep the signal light 110 burning after signal bimetal 108 has cooled off.

Circuit breaker 8 is provided to protect transformer 2. The circuit breaker 8 includes trip solenoid 22, reclosing solenoid 114, breaker contacts 24 and 26, normally closed contact 38 associated in series circuit relationship with normally open trip control relay contact 36, normally open contact 116 associated with signal light 110, linkage 113 and normally closed contact 120 mechanically associated with trip solenoid 22.

While only one transformer 2 and its associated circuit breaker 8 have been described, it will be understood that transformers 4 and 6 are identical to transformer 2. For example, tripping control relays 32 and 34 of transformers 4 and 6 respectively are identical to tripping control relay 30 of transformer 2 in construction and function.

The embodiment of the invention shown in FIG. 1 is essentially an electrical interlock in which the three single phase transformers 2, 4 and 6 which may be three phase connected are prevented from single-phasing should one of the transformer circuit breakers such as 8 open because of overload or other reason. The transformer circuit breakers such as circuit breaker 8 of transformer 2 are actuated by pickup coils such as pickup coil 12 which is magnetically coupled to secondary leads 14 and 16 of transformer 2. When an overload is sensed by the pickup coil 12 on the secondary of transformer 2, the normally open trip bimetal 20 closes and completes a circuit which grounds point 18, thereby connecting the trip control relay 30 and trip solenoid 22 in series across the control voltage winding 10 of transformer 2. Contact 36 is then closed establishing another path to ground from point 18. The normally closed breaker contacts 24 and 26 are opened by trip solenoid 22. Contact 120 is also opened to isolate reclosing solenoid 114.

Tripping control relays 32 and 34 of transformers 4 and 6 respectively are connected in series with tripping control relay 30 of transformer 2. Thus, a trip signal from a trip bimetal such as trip bimetal 20 of transformer 2 or a manual trip signal from a selector switch of any one transformer such as selector switch 28 of transformer 2 will trip all three of the transformer circuit breakers such as circuit breaker 8 of transformer 2 and remove all three transformers 2, 4 and 6 from the load circuit.

Normally open contact 116 which is mechanically coupled to breaker contacts 24 and 26 serves to operate signal light and latch relay 112 when the breaker 8 opens.

Normally closed contact 38, in electrical series with contact 36, opens by direct mechanical linkage with the breaker contacts 24 and 26 to disconnect and deenergize the trip solenoid 22 and the trip control relay 30 as soon as the breaker contacts 24 and 26 are fully opened and trip bimetal 20 has cooled enough to break contact with point 18.

FIG. 2 illustrates an embodiment of the invention applied to a three phase transformer 50. The transformer 50 comprises three primary windings 124, 126 and 128, and three secondary windings 44, 46 and 48. The illustrated connection of the transformer windings is Y primary to Y secondary. It will be understood, however, that the invention is not limited to any particular connection of windings.

Two pickup coils or instrument transformers 52 and 54 are provided to sense overloads on transformer secondary windings 44, 46 and 48. Two bimetal elements 56 and 96 are placed in a series circuit relationship with pickup coil 52; in like manner, bimetal elements 58 and 98 are placed in a series circuit relationship with pickup coil 54. The bimetal elements 96 and 98 function as signal bimetals and bimetals 56 and 58 function as trip bimetals.

A trip control relay 60 is supplied in circuit relationship with trip bimetals 56 and 58. Normally open contact 62 is mechanically linked to trip control relay 60. A selector switch 78 and associated exterior operating handle 122 are provided for manual operation of circuit breakers which will be described in detail later. A control voltage winding 130 is provided on the secondary side of transformer 50. A signal light 100 connected to a tap on control voltage winding 130 functions with signal bimetals 96 and 98. Signal bimetals 96 and 98 turn on signal light 100 to indicate an overload on transformer 50. The signal bimetals close sooner than the trip bimetals to indicate impending breaker opening. A latch relay 102 is provided in parallel with signal light 100 to keep the signal light 100 burning after the signal bimetals 56 and 58 have cooled off. Maintenance personnel are thus warned that transformer 50 has been overloaded.

Two circuit breakers 40 and 42 are provided to protect transformer 50. The circuit breakers 40 and 42 are substantially identical, therefore only circuit breaker 40 will be described in detail.

The circuit breaker 40 includes trip solenoid 66, reclosing solenoid 84, breaker contacts 68 and 70, normally closed contact 74 associated in circuit relationship with normally open contact 62 of trip control relay 60, normally open contact 103 associated in circuit relationship with a signal light 100, and normally closed contact 132 associated mechanically with trip solenoid 62.

The embodiment of the invention shown in FIG. 2 is essentially an electrical interlock by which a three phase transformer 50 using two single phase circuit breakers is prevented from single-phasing should one of the transformer circuit breakers such as circuit breaker 40 open because of overload or other reason.

The circuit breakers 40 and 42 are actuated by either or both of the pickup coils 52 and 54 which sense overloads on the secondary side of three phase transformer 50. Either or both of the normally open trip bimetals 56 and 58 will, upon receiving sufficient current from the associated pickup coil, heat up and close energizing trip control relay 60 and trip solenoids 64 and 66 by connecting them in series parallel across control winding 130. The normally closed breaker contacts 68, 70 and 72 are now forced open. Trip control relay 60 closes normally open contact 62; this gives trip solenoids 64 and 66 as well as trip control relay 60 another path to ground independent of the ground contact established through trip bimetal 56, trip bimetal 58, or both trip bimetals 56 and 58 in parallel. This so-called lock in arrangement is a safeguard against the possibility that the trip bimetals 56 and 58 might return to their open positions before both circuit breakers 40 and 42 are fully open. Normally closed contacts 74 and 76 in series parallel with normally open trip control relay contact 62 open by mechanical linkage with breaker contacts 68, 70 and 72 to deenergize the trip solenoids 64 and 66 when the breaker contacts 68, 70 and 72 are fully opened and the trip bimetals 56 and 58 have cooled enough to break contact with trip control relay 60. Normally closed contacts 132 and 134 are opened by mechanical linkages with trip solenoids 66 and 64 respectively to isolate the reclosing solenoids 84 and 86 during the trip cycle. Normally open contacts 103 and 105 mechanically coupled to the breaker contacts serve to operate the signal light 100 and latch relay 102 when the breakers 40 and 42 are opened by placing a portion of control voltage winding 130 across the signal light 100 and the latch relay 102. The latch relay 102 is a so-called "lock in" relay which keeps the signal light 100 burning after the signal bimetals 96 and 98 have indicated an impending closing of the trip bimetals 56 and 58 by heating up and turning signal light 100 on. It will be understood that the trip bimetals 56 and 58 are built to be slower acting than the signal bimetals 96 and 98.

The circuit breakers 40 and 42 may be reclosed by means of the manually operated selector switch 78. When the selector switch contacts 80 and 82 are shorted reclosing solenoids 84 and 86 are energized; the circuit breaker contacts 68, 70 and 72 are then reclosed mechanically through linkages 88 and 90.

Referring to FIG. 3 of the drawings, there is illustrated in simplified schematic form an embodiment of the invention which achieves interlocked operation of a plurality of electrically operated circuit breakers (not shown). A plurality of circuit breaker operating solenoids 166, 168 and 170 or other electromechanical actuating devices are connected in electrical series with the same number of relays 136, 138 and 140. Normally open contacts 156, 158 and 160 are placed in each of these series electrical circuits. Any one of these contacts may be closed manually or by overload sensing means (not shown) associated with the circuit breaker (not shown) actuated by the individual tripping solenoid. The relays 136, 138, and 140 are connected in electrical series; normally open relay contacts 146, 148 and 150 are mechanically linked to relays 136, 138 and 140 respectively. Because the relays 136, 138 and 140 are connected in electrical series, if one of the relays is energized, all of the relays will be energized. The power sources for relay and operating solenoid operation may be any convenient power supplies such as transformer control windings 176, 178 and 180. If all the relays are energized by the closing of any one relay circuit breaker operating solenoid series circuit, all of the normally open relay contacts 146, 148 and 150 will be closed, thus actuating the remaining circuit breaker operating solenoids. This effective interlocking of a plurality of circuit breakers prevents the possibility of single phasing by the opening of one circuit breaker while the other circuit breakers remain closed.

It will be understood that the above-described interlock may be used for any number of phases, although for simplicity only a three-phase embodiment is illustrated. This disclosed interlock may be used to interlock circuit breaker opening or it may be used to interlock circuit breaker reclosing. If the invention is used for interlocked circuit breaker opening, the circuit breaker operating solenoids 166, 168 and 170 will be the tripping solenoids of the associated circuit breakers; if the invention is used to interlock electrically operated circuit breaker reclosing, circuit breaker reclosing solenoids or other electromechanical actuating devices will be substituted for the circuit breaker tripping solenoids 166, 168 and 170.

While the invention is particularly suitable for interlocking several electrically operated single-phase transformer circuit breakers, the invention may be applied generally to the interlocking of single-phase electrically operated circuit breakers in other multi-phase applications where it is desirable to prevent single phasing.

It will, therefore, be apparent that there has been disclosed an interlock which will prevent single-phasing when single-phase transformers are used in a three-phase bank, a three-phase transformer may also be protected by the interlock when the interlock is modified for use in conjunction with two single phase circuit breakers.

While there have been shown and described what are at present considered to be the preferred embodiments of the invention, modifications thereto will readily occur to those skilled in the art. It is not desired, therefore, that the invention be limited to the specific arrangements shown and described and it is intended to cover in the appended claims all such modifications as fall within the true spirit and scope of the invention.

I claim as my invention:

1. In combination,
a plurality of circuit interrupting devices each having separable contacts connected in a different phase of a polyphase electrical system,
first electroresponsive control means for releasably maintaining the separable contacts of each of said plurality of circuit interrupting devices in engagement,
auxiliary contact means associated with each of said plurality of circuit interrupting devices, which open and close in response to the opening and closing of the separable contacts of its associated circuit interrupting device,
circuit responsive means associated with each of the different phases of the polyphase electrical system, each of said circuit responsive means having contacts which close upon a predetermined circuit condition,
second electroresponsive control means associated with each of said first electroresponsive control means, each of said second electroresponsive control means having contacts which close when energized,
each of said circuit interrupting devices having an associated control circuit which includes said first and second electroresponsive control means, and said circuit responsive means connected in series circuit relation, with the contacts of said second electroresponsive control means and the auxiliary contacts of the associated circuit interrupting device being serially connected across said circuit responsive means,
said first and second electroresponsive control means being energized when the circuit responsive means closes its contacts, with the second electroresponsive control means closing its contacts to maintain the circuit through said first and second electroresponsive control means regardless of the subsequent position of the contacts of said circuit responsive means until the associated circuit interrupting means opens its separable contacts,
and means interconnecting the second electroresponsive control means of each electrical phase, to energize all of said second electroresponsive control means when the circuit responsive means of one phase closes its contacts, to energize all of said first electroresponsive control means and open the separable contacts of all of said circuit interrupting devices.

2. In combination,
a plurality of circuit interrupting devices each having separable contacts connected in a different phase of a polyphase electrical system,
first electroresponsive control means for releasably maintaining the separable contacts of each of said plurality of circuit interrupting devices in engagement, said first electroresponsive control means being connected in parallel circuit relation,
auxiliary contact means associated with each of said plurality of circuit interrupting devices which open and close in response to the opening and closing of the separable contacts of its associated circuit interrupting device, said auxiliary contact means being connected in parallel circuit relation,
circuit responsive means associated with each of the different phases of the polyphase electrical system, each of said circuit responsive means having contacts which close upon a predetermined circuit condition, the contacts of said circuit responsive means being connected in parallel circuit relation,
an electroresponsive control device having contacts which close when energized,
a source of electrical potential,
said electroresponsive control device, said parallel connected first electroresponsive control means, and said parallel connected circuit responsive means, being serially connected across said source of electrical potential,
the contacts of said electroresponsive control device and said parallel connected auxiliary contact means being serially connected across said parallel connected circuit responsive means,
said electroresponsive control device being energized to close its contacts when one of said circuit responsive means closes its contacts, to ensure that all of said first electroresponsive control means open the separable contacts on its associated circuit interrupting device.

References Cited by the Examiner
UNITED STATES PATENTS

| | | | |
|---|---|---|---|
| 853,374 | 5/1907 | Randall | 323—62 X |
| 2,370,037 | 2/1945 | Hurst | 317—46 |
| 2,705,295 | 3/1955 | Edwards | 317—46 |

MILTON O. HIRSHFIELD, *Primary Examiner.*

SAMUEL BERNSTEIN, *Examiner.*

J. D. TRAMMELL, *Assistant Examiner.*